(12) United States Patent
Kryskow, Jr. et al.

(10) Patent No.: US 7,406,532 B2
(45) Date of Patent: *Jul. 29, 2008

(54) AUTO CONTROL OF NETWORK MONITORING AND SIMULATION

(75) Inventors: Joseph M. Kryskow, Jr., Hudson, NH (US); Richard E. Hudnall, Nashua, NH (US); Lowell Kopp, Winchester, MA (US)

(73) Assignee: Infrastructure Innovations, LLC, Boston, MA (US)

( * ) Notice: Subject to any disclaimer, the term of this patent is extended or adjusted under 35 U.S.C. 154(b) by 17 days.

This patent is subject to a terminal disclaimer.

(21) Appl. No.: 11/543,373

(22) Filed: Oct. 3, 2006

(65) Prior Publication Data

US 2007/0124461 A1  May 31, 2007

Related U.S. Application Data

(63) Continuation of application No. 10/222,193, filed on Aug. 16, 2002, now Pat. No. 7,117,261, which is a continuation of application No. PCT/US01/04876, filed on Feb. 16, 2001.

(51) Int. Cl.
*G06F 15/16* (2006.01)

(52) U.S. Cl. .................. 709/234; 709/223; 709/224; 709/235; 370/229

(58) Field of Classification Search ......... 709/223–224, 709/234, 235; 370/229–235; 717/102, 104, 717/134, 135, 138, 155; 703/13, 23
See application file for complete search history.

(56) References Cited

U.S. PATENT DOCUMENTS

| 5,913,041 | A | 6/1999 | Ramanathan et al. |
| 6,011,776 | A | 1/2000 | Berthaud et al. |
| 6,011,790 | A | 1/2000 | Fisher |
| 6,011,804 | A | 1/2000 | Bertin et al. |
| 6,058,260 | A * | 5/2000 | Brockel et al. .................. 703/4 |
| 6,336,138 | B1 * | 1/2002 | Caswell et al. .............. 709/223 |

OTHER PUBLICATIONS

Real-Time SLA Monitoring Tools by Jamie Warter, Network World Fusion, Jan. 15, 2001.

* cited by examiner

*Primary Examiner*—Frantz B. Jean

(57) ABSTRACT

In response to an automatic baseline input, a default control template for a site in a telecommunications network is translated into monitoring and simulation templates. Current end-to-end application and component information are translated into operational modes for monitoring and simulation modules according to the monitoring and simulation templates. Operational controls are established for controlling the monitoring and simulation modules for controlling, in real time, the transmission of network management and simulation traffic.

20 Claims, 14 Drawing Sheets

Monitor Controls

FIG. 3 TYPICAL DEPLOYMENT

4-Port Module Block Diagram

Note: All buffers may be in a common buffer pool.

Master Control Module Block Diagram

Director Console Architecture

Director Console Interfaces

AUTO CONTROL OF NETWORK MONITORING AND SIMULATION

CROSS REFERENCE TO RELATED APPLICATIONS

The present application is a continuation of U.S. patent application Ser. No. 10/222,193 filed Aug. 16, 2002 as a continuation of International Application No. PCT/US01/04876 filed Feb. 16, 2001, now U.S. Pat. No. 7,117,261, issued Oct. 3, 2006.

The present application discloses subject matter which is disclosed and may be claimed in the following international applications as identified below and which are hereby incorporated by reference:

Application Ser. No. PCT/US01/05119 filed Feb. 16, 2001 (U.S. application Ser. No. 10/223,067) is directed to a closed loop method for baselining business bandwidth in a network environment.

Application Ser. No. PCT/US01/05021 filed Feb. 16, 2001 (U.S. application Ser. No. 10/222,190) is directed to monitoring and simulation of business bandwidth.

Application Ser. No. PCT/US01/05120 filed Feb. 16, 2001 (U.S. application Ser. No. 10/222,211) is directed to analysis of business bandwidth for control of same.

Application No. PCT/US01/04873 filed Feb. 16, 2001, now U.S. Pat. No. 6,763,389, is an extension of PCT/US01/05119, PCT/US01/05021, PCT/US01/05120 and PCT/US01/04876 all filed Feb. 16, 2001 with respect to exportation of information in a multiple management environment (multiple users with different SLAs).

BACKGROUND OF THE INVENTION

1. Technical Field

The present invention relates to automatic control of monitoring and simulation within closed-loop control methodologies applied to the field of on-line business bandwidth management tools.

2. Discussion of Related Art

Simply stated, the current rate of change in business bandwidth management is getting out of control. IT business owners and service providers are struggling to manage business systems. Transport of data is exploding at unbelievable growth rates and some service providers are straining at full capacity. Even though data from multimedia networks is still a relatively small proportion of the whole, this is expected to change in the near future. The performance of these streaming protocols is not visible to network probes and sniffers. Service providers and business managers mistrust each other due to the stressful environment. Most service provider contracts are now mandating service level agreements (SLAs) to try to get a mechanism in place to enforce what is promised versus what is delivered. Business managers are contemplating increasing their outsourcing due to the need for outside assistance in managing their networks and therefore new dynamic services are needed. Furthermore, in view of the fact that dynamic routing and the impending internet to "virtual" services model will obsolete current modeling and planning tools new solutions are needed.

SUMMARY OF INVENTION

An object of the present invention is to provide automatic control of monitoring and simulation in closed-loop control methodologies applied to the field of automated on-line business bandwidth management tools.

Another object of the present invention is to manage and control, in real time, the transmission of network management and simulation traffic.

According to the present invention, a method for controlling aspects of network traffic for sites in a telecommunications network, comprises the steps of translating a default control template for each site into a site specific template in response to an automatic baseline input, translating the site specific template into monitoring and simulation templates, translating current end-to-end and component information into operational modes for monitoring and simulation modules according to the monitoring and simulation templates, and establishing operational controls for controlling the monitoring and simulation modules for controlling, in real time, the transmission of network management and simulation traffic.

The above features permit the objects of the present invention to be accomplished by minimizing or limiting the amount of network resources used by the service assessment monitoring and simulation system. In this way the effects of the management and simulation traffic on actual customer traffic is likewise minimized or limited. The timeliness and analysis accuracy of the management and simulation services are increased as a result.

The unique components that comprise the auto controlling of monitoring and simulation functions are:

two levels of auto feedback controls for maintaining levels of accuracy without significant interference ("Heisenberg" for short) in the presence of widely varying network traffic.

One feedback level while establishing/starting the specific monitoring and simulation functions (feedback due to baseline characterization).

Second feedback level while actually running the monitoring and simulations functions (runtime measurement/characterization).

The ability to auto increase accuracy in lightly loaded/unused components of the network in order to detect communication faults/problems even with minimum to no business bandwidth traffic (using current measurement characterization). I.e., controlling monitoring simulation to minimize interference and, wherever possible, increase accuracy.

Specific settings for monitoring and simulation controls (measurement resolution, type of measurements, speed of adjustment).

Consequently, the ability to initiate, configure and control simulation traffic is provided. The results of the simulation may now be continually monitored and analyzed in real time. This results in the ability to continually monitor and analyze the impact of changes in actual customer traffic in real time. Simulation traffic may be changed or modified (tune/decrease) based on the simulated analyzed results in order to achieve a predefined minimum impact from each simulation service. The ability to change or modify (tune/increase) the simulation traffic (based on analysis results) is provided to increase the accuracy of the analysis.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 shows monitor controls for active monitoring used for controlling of network business bandwidth, according to the present invention.

FIG. 2 shows simulation controls, according to the present invention, for use in tuning and controlling network business bandwidth.

FIG. 7 shows a director console,

FIG. 8 shows director console interfaces,

FIG. 9 shows director console control interface module,

FIG. 10 shows data base access,

FIG. 11 shows a director console interface for interfacing n-port SLA modules,

FIG. 12 shows director console control data flow,

FIG. 13 shows SLA monitoring controls, and

FIG. 14 shows data base analysis.

BEST MODE FOR CARRYING OUT THE INVENTION

Figure 1:
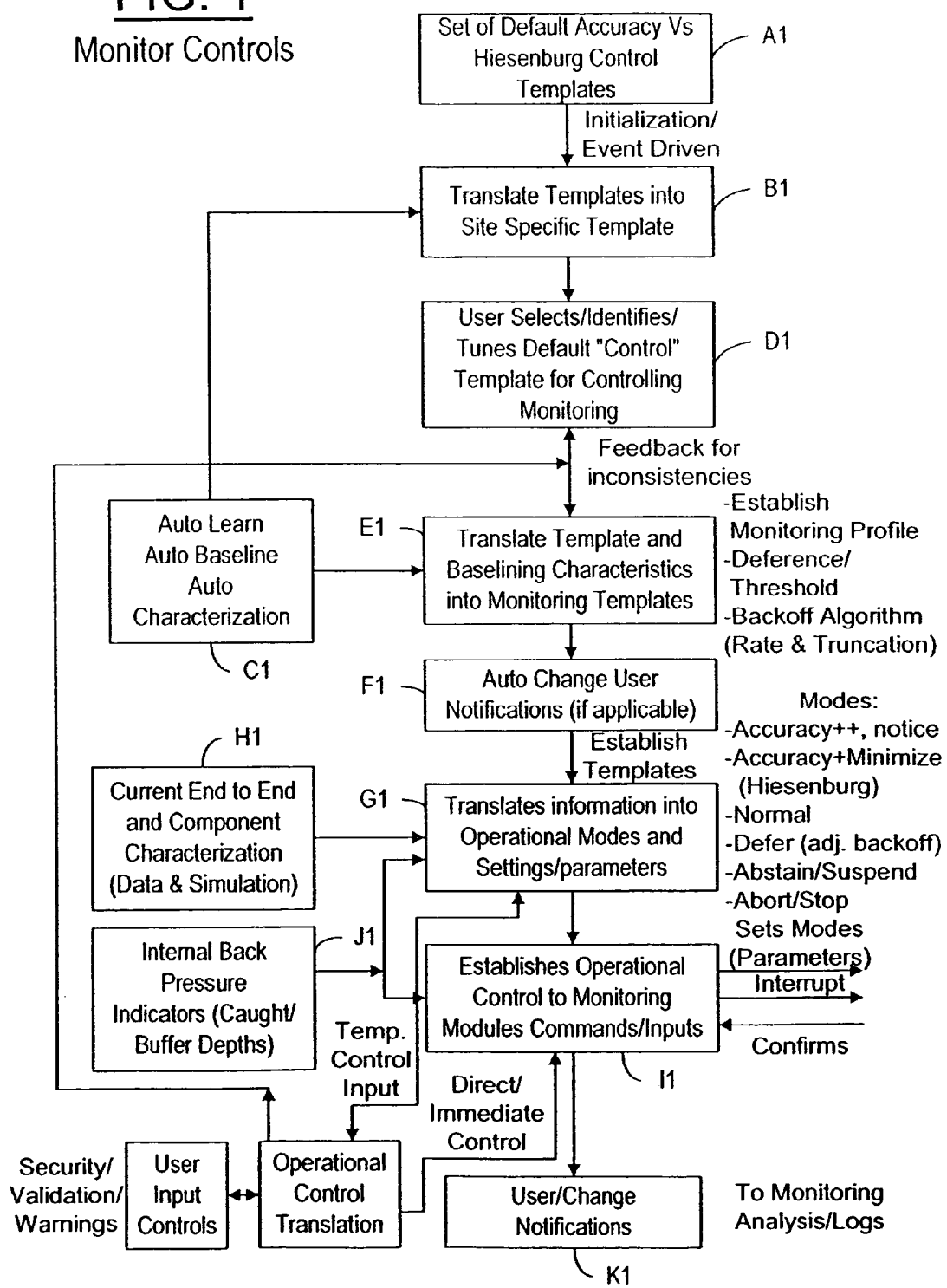
FIG. 1 shows automatic control of monitoring in a closed-loop control methodology applied to the field of automated on-line business bandwidth management tools.

In a closed-loop control methodology applied to the field of automated on-line business bandwidth management, a monitoring domain is used in conjunction with a simulation domain and a bandwidth profile domain to manage bandwidth automatically in accordance with a service level agreement. The present invention is primarily related to controls employed in both the monitoring domain and the simulation domain as influenced by the bandwidth profile domain. FIG. 1 describes monitor controls while FIG. 2 describes simulation controls, according to the present invention. Due to their similarity, they will be described together and similar reference symbols will be used to refer to similar steps.

Figure 2:
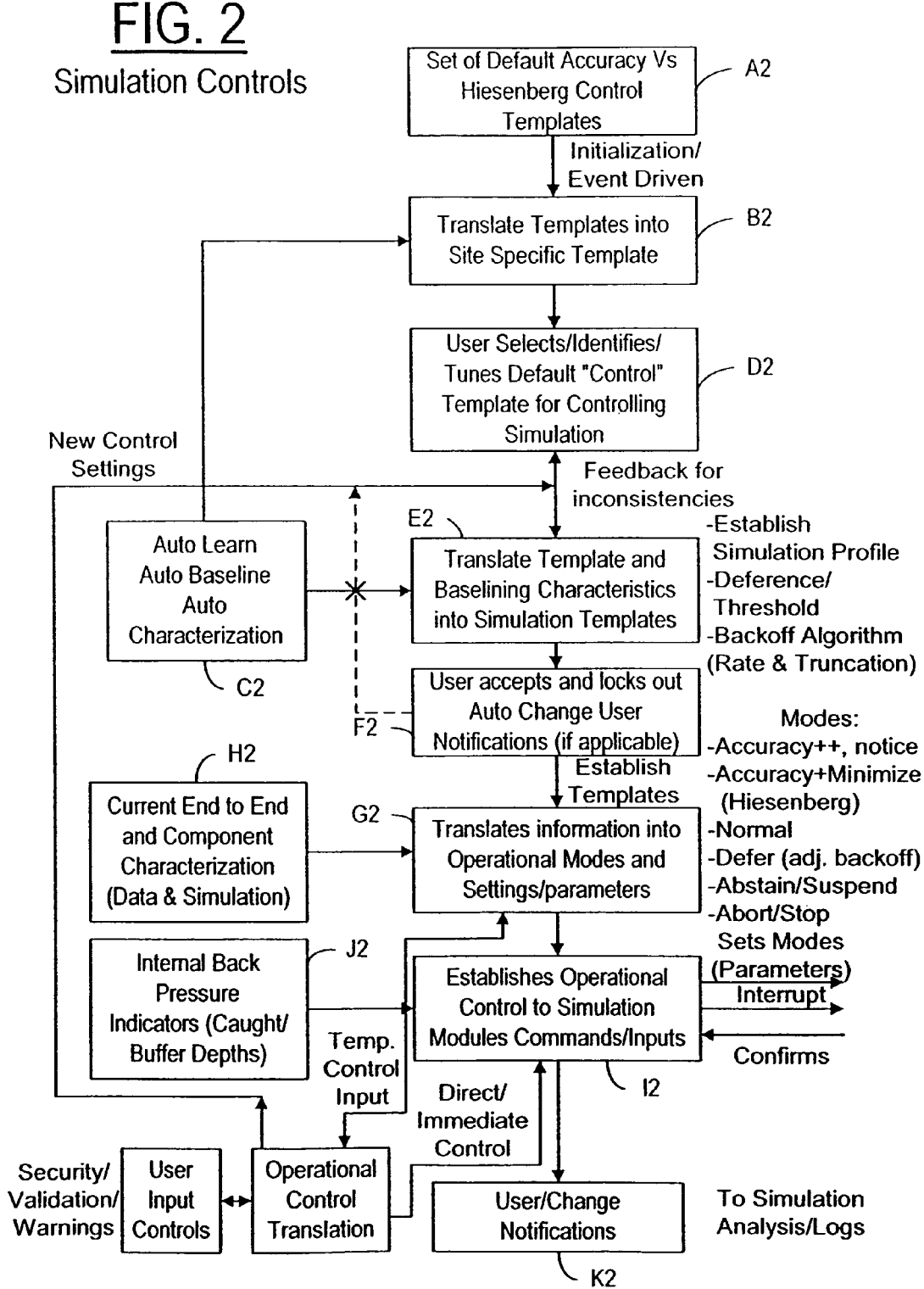
FIG. 2 shows automatic control of simulation in a closed-loop control methodology applied to the field of automated on-line business bandwidth management tools.

The monitoring and simulation controls as illustrated in FIGS. 1 and 2 perform automatic controls tuning of network business bandwidth active monitoring and simulation tools, i.e., tools that interact with the components on the network end nodes, servers, network products and other management tools. The utilization of both passive and active monitoring is described in more detail in copending International Application No. (Attorney Docket No. 402-127.3-1) entitled "Automated On-Line Business Bandwidth Planning Methodology". In general, the primary purpose for adjusting and controlling these tools are:

While actively monitoring any component, minimizing the impact to that component (and the network bandwidth for any other component).

While actively monitoring any component, increasing the accuracy of the monitoring tool by increasing the sampling/interaction rate while attempting to maintain a well-identified impact to that component/network. (Interference vs. measurement accuracy tradeoffs; also called Controlling "Heisenberg").

While performing any on line simulation, temporarily altering the simulation (temporal) to minimize the impact on applications. (Thus, the simulation is interfering with itself). Any altering of the simulation must be noted.

While performing a simulation, automatically (e.g., temporarily) increasing the accuracy of the simulation (e.g., no altering/impact of the simulation) to more accurately identify the impact to applications' business bandwidth (and to specific components). When interference to the bandwidth is caused by the operation of the tool, notices are sent to the simulator.

User adjustments/tuning of the auto control features for specific tests and measurements. NOTE: Another view of this auto control is a closed loop feedback path to monitoring and simulation tools.)

More specifically, referring now to FIGS. 1 and 2, the following description will use alphanumerics as reference symbols with the same upper case letter used to describe a similar step in each of the FIGS. 1 and 2 with the suffix being a reference to the figure number. Starting with a step A1, A2, an initial "set" of embedded default control settings (templates) are established. These will be the basis of a "control" template for controlling the active monitoring and simulation activities in such a way as to minimize to virtually zero the impact of monitoring activities on the network business bandwidth of the various applications running on the network. Examples of setting types and specific parameters/algorithms are:

Transmit only on "zero" buffer length, and

No traffic in "X" ms, and

Average traffic in last "X" ms<50%, and * Last transmission to the device "<Y packets" in last "7" ms Notification if transmission defer in "AA" ms However if:

Average traffic in last "Z" sec.<"5% and

Average traffic in last "z/100" sec<10%

Then

Double interaction message rate (adjusting above parameters accordingly)

The above examples of setting types and specific parameters/algorithms exemplify the concept of "Heisenberg" which seeks to carry out simulations on the network without significantly interfering with traffic. This can be facilitated by "backing-off" when it is determined that the simulation is causing interference with regular traffic. It is of course a concept which may be analogized to the idea that the observation in itself causes effects on the system.

Once the initial set of embedded default control settings (templates) are established, a step B1, B2 is carried out to automatically establish site control templates, i.e., the control settings established in step A1, A2 are adjusted based on characterizations of the network and components (scale, scope, utilization, etc.). This can be based in part on a step C1, C2 which implements autolearning, autobaselining and autocharacterization as more fully described in copending International Application No. entitled "Method of Automatically Baselining Business Bandwidth". Such is also described as part of a bandwidth profile domain described in the above mentioned copending International Application No. entitled "Automated On Line Business Bandwidth Planning Methodology". The user is also able to select/identify/tune default "control" templates for controlling the monitoring (FIG. 1) or simulation (FIG. 2) as shown in steps D1, D2. These adjustments are still met to maintain zero Heisenberg and increase accuracy where appropriate. If the basic accuracy cannot be meant due for instance to continual large capacity, then a specific accuracy will be identified by way of a notice to user for instance by logging via an accuracy or Heisenberg display.

Additionally, the user will also be able to adjust the individual settings. These adjustments can be made at any time during the monitoring of FIG. 1 or the simulation of FIG. 2.

A site-specific control template is then translated in a step E1, E2 into operational control settings which are then verified This verification makes sure that the control settings can be met with the existing state of the customer site, e.g., no current problems. After user acceptance and/or autochange user notifications are applied in a step F1, F2, the operational metrics are translated into specific internal mode control settings and parameter inputs as shown in step G1 for monitoring and G2 for simulation in FIGS. 1 and 2 respectively. This translation uses the current existing characterization of both the business bandwidth and the internal transmit state/indicators of the tool In addition to input from the step F1, F2, the step G1, G2 receives input from a step H1, H2 indicative of current end-to-end and component characterization (data and simulation).

Once the translation of step G1, G2 is completed, a direct control (second feedback path) is carried out in a step I1, I2 in which operational control to monitoring modules command/inputs is established. Direct control is established of the specific modes and parameters/values that the monitoring and simulation functions use to control their internal operating characteristics. Therefore, this direct control function takes the specifically developed mode and parameter control settings from step G1, G2 and transfers them to the monitoring functions of FIG. 1 and the simulation functions of FIG. 2 in such a way as to affect their operations immediately. An output set modes (parameters) with interrupts is provided and confirmation is received. It should be mentioned that either or both the translation step G1, G2 and the establishment step I1, I2 may be responsive to an internal back pressure indicator provided in a step J1, J2 for modifying the translation/establishment of the operational mode/controls.

The user, at any time, can adjust any control setting for monitoring and simulation in FIGS. 1 and 2. However, this function must contain access control and security features with warnings of potential impact on applications, network activities including jeopardizing SLA components User/change notifications are provided to monitoring/simulation analysis/logs in a step K1, K2.

User input controls are shown to which operational control translation is responsive for providing new control settings and/or direct/immediate control as shown. Such can also constitute temporary control input as also shown.

Figure 3:
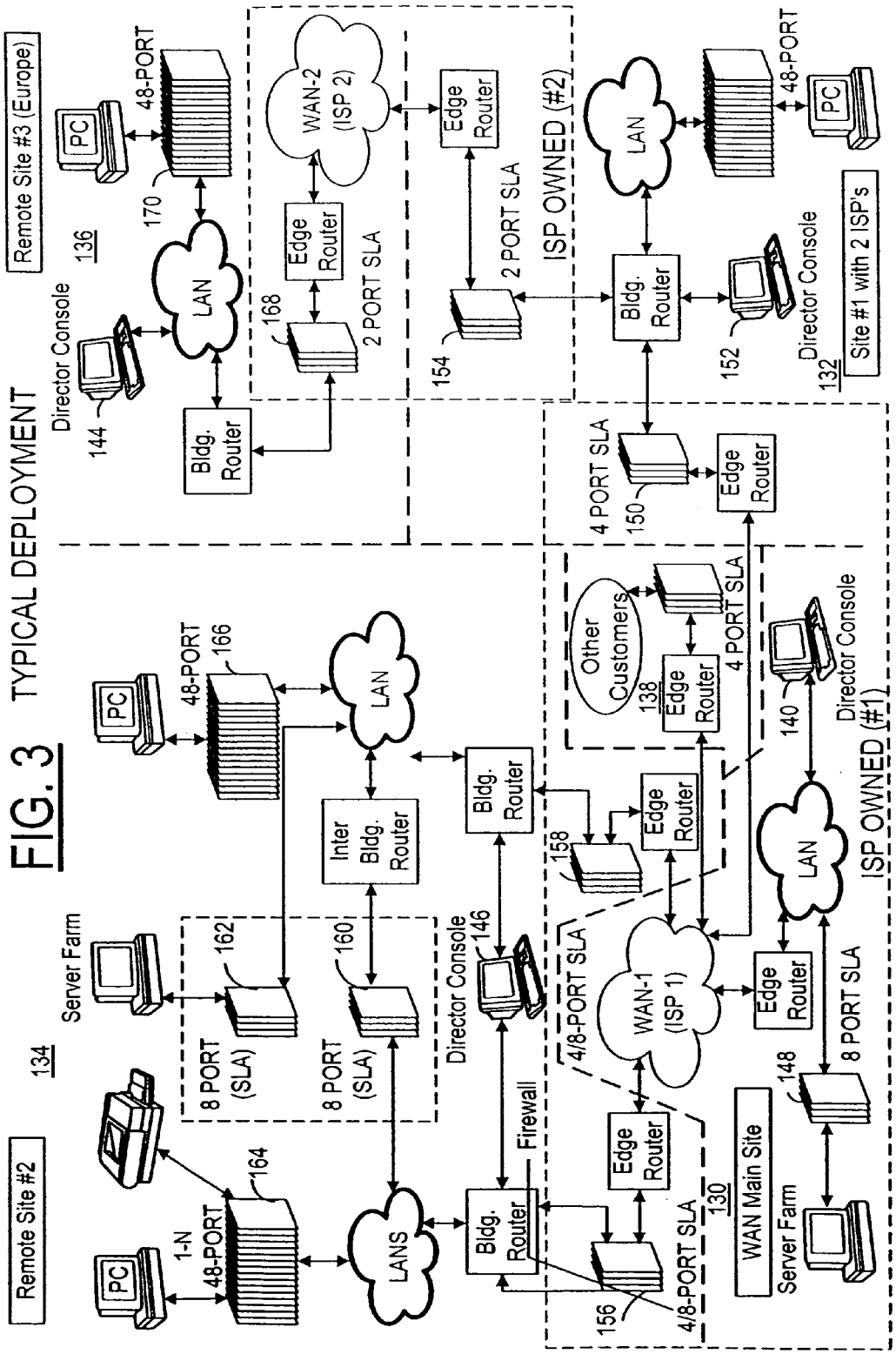
FIG. 3 shows a typical deployment of the present invention in a network with both n-port SLA modules and director consoles, according to the present invention.

FIG. 3 shows a typical deployment of the present invention for use over a wide geographical area including a main site and various remote sites. Such might include a main site, a first remote site, a second remote site and a third remote site. Other customers are also indicated Basic building blocks comprise one or more director consoles and a plurality of n-port SLA modules. The n-port SLA modules are used to measure and preprocess the collected data and to communicate the monitored data to the director consoles. The director consoles are in part in control of the n-port SLA modules and together with the modules are used to carry out the present invention. The n-port SLA modules are shown connected to various user equipments and to local area networks (LANs) for communication with the director consoles through building routers, intrabuilding routers, and wide area networks (WANs) served by various ISPs. A service level agreement between an ISP and the main site for instance will include various baseline parameters relating to different types of traffic such as voice, video, transaction data or various other services. It is in the interest of both the business (enterprise) owner deploying at the main site and the remote sites and the ISP or ISPs to manage the transport of data between the main site and the remote sites in such a way that the performance is visible and the environment can become one of trust. This can be accomplished according to the present invention by deploying a plurality of n-port SLA modules as shown for measuring, changing, simulating and reporting business bandwidth usage to either the enterprise owner, the ISP or both An independent service will be more effective in this regard since the trust level will be higher if the measurements and reporting is carried out by an independent operator. However, it should be understood that the present invention is operable by an ISP by itself or by the enterprise by itself.

Figure 4:
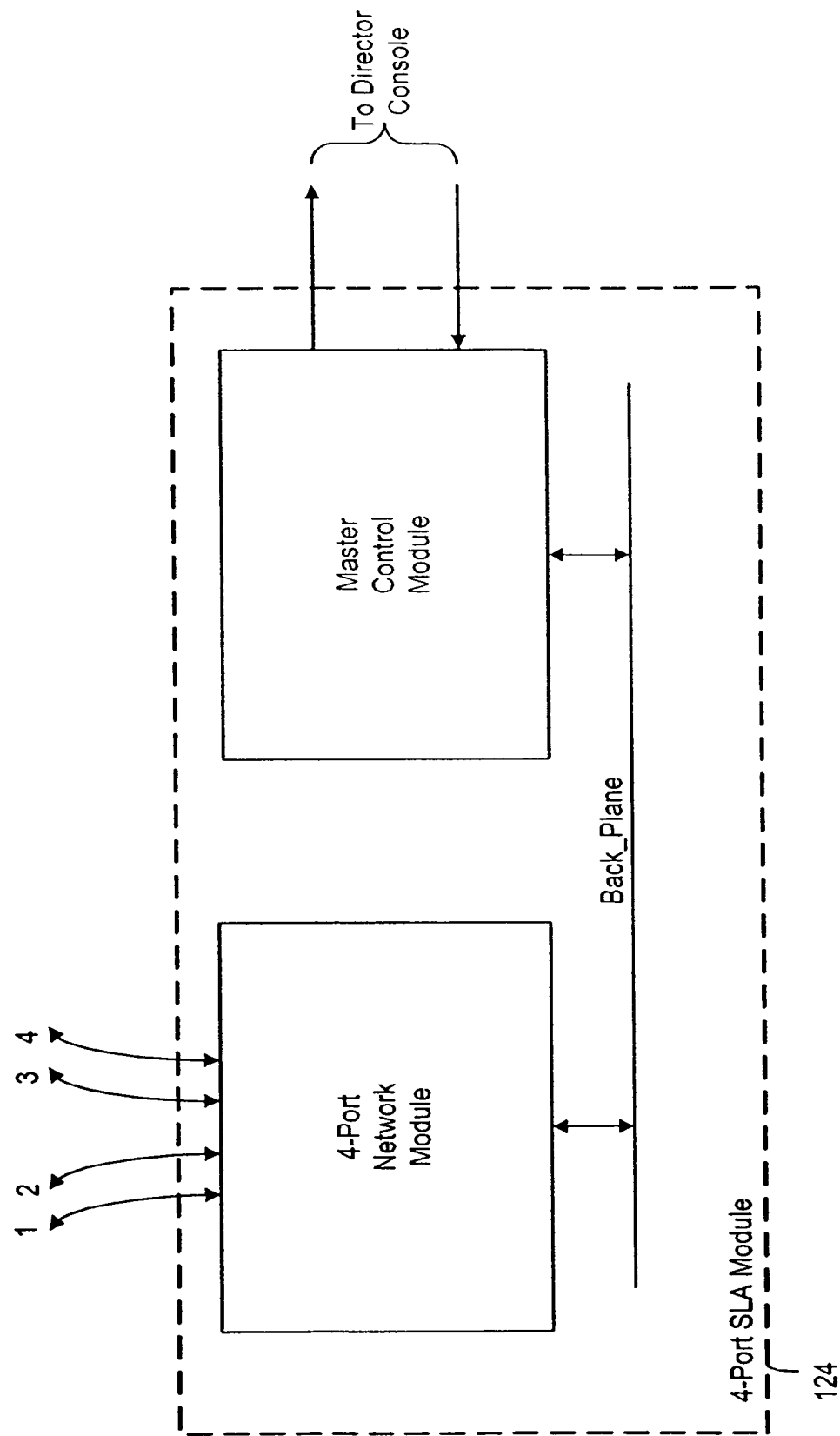
FIG. 4 shows a four-port SLA module, according to the present invention.
Figure 5:
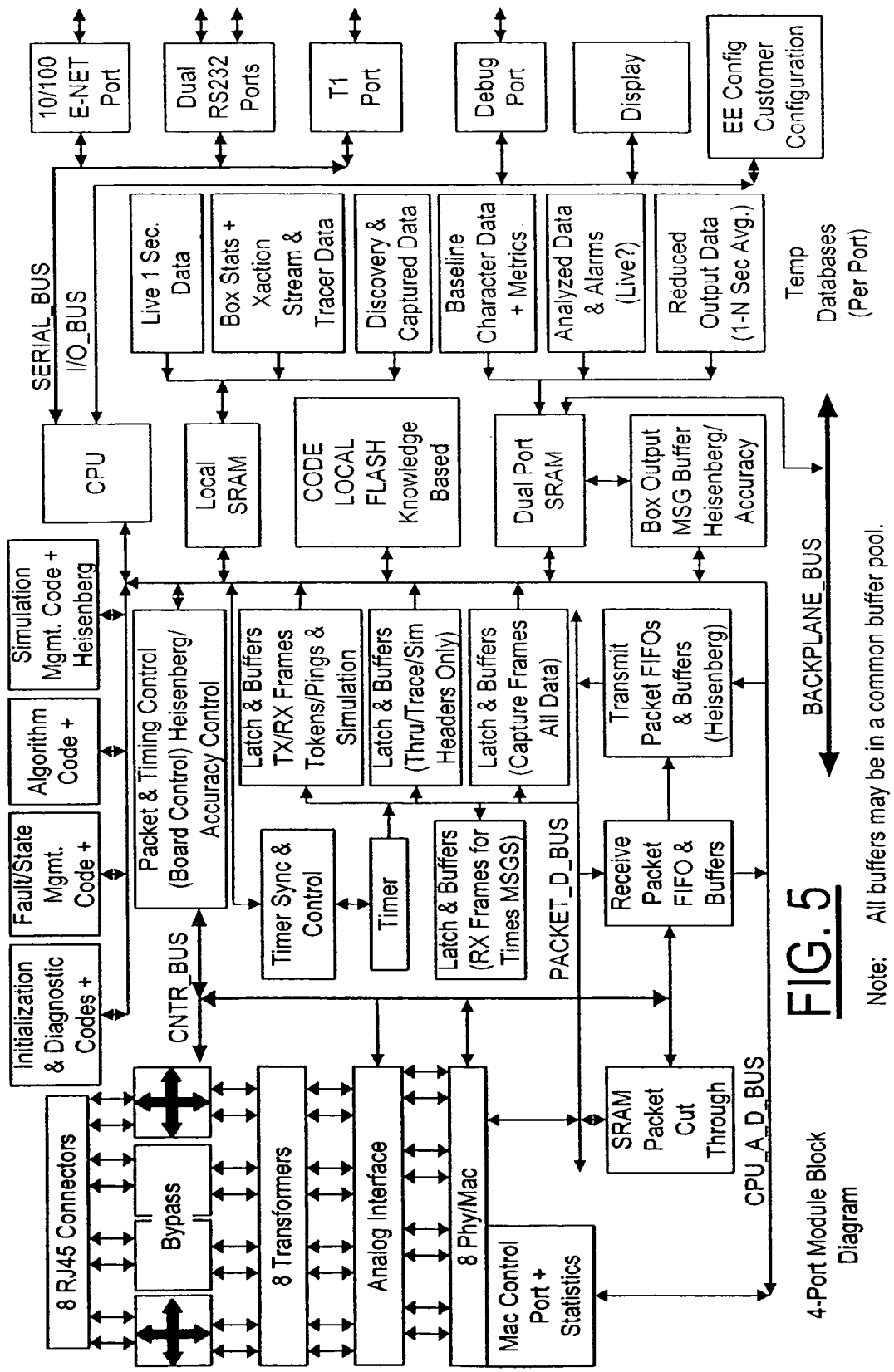
FIG. 5 shows the four-port network module of the four-port SLA module of FIG. 4.
Figure 6:
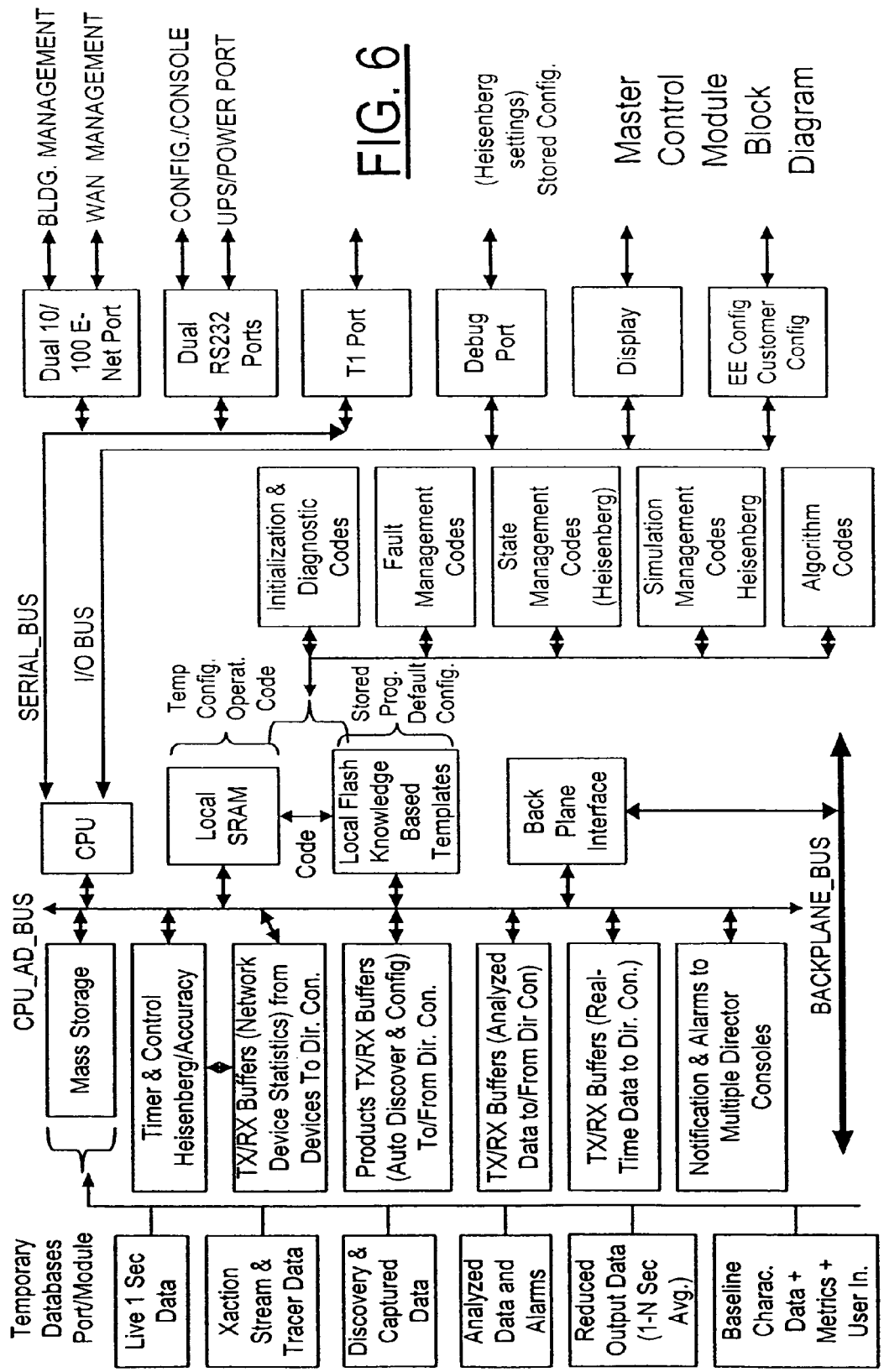
FIG. 6 shows the master control module of the four-port SLA module of FIG. 4.
Figure 7:
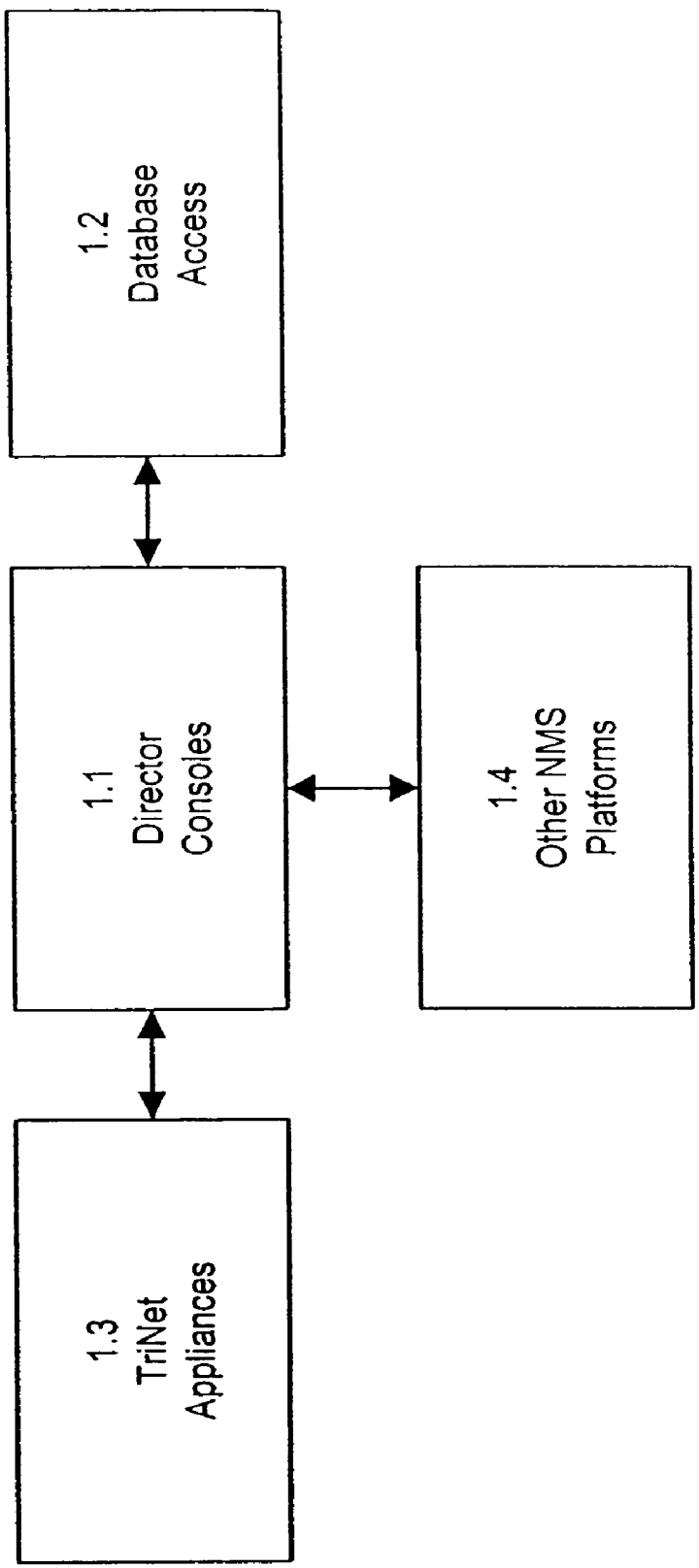
FIGS. 7-14 show a director console architecture, according to the present invention, where.
Figure 8:
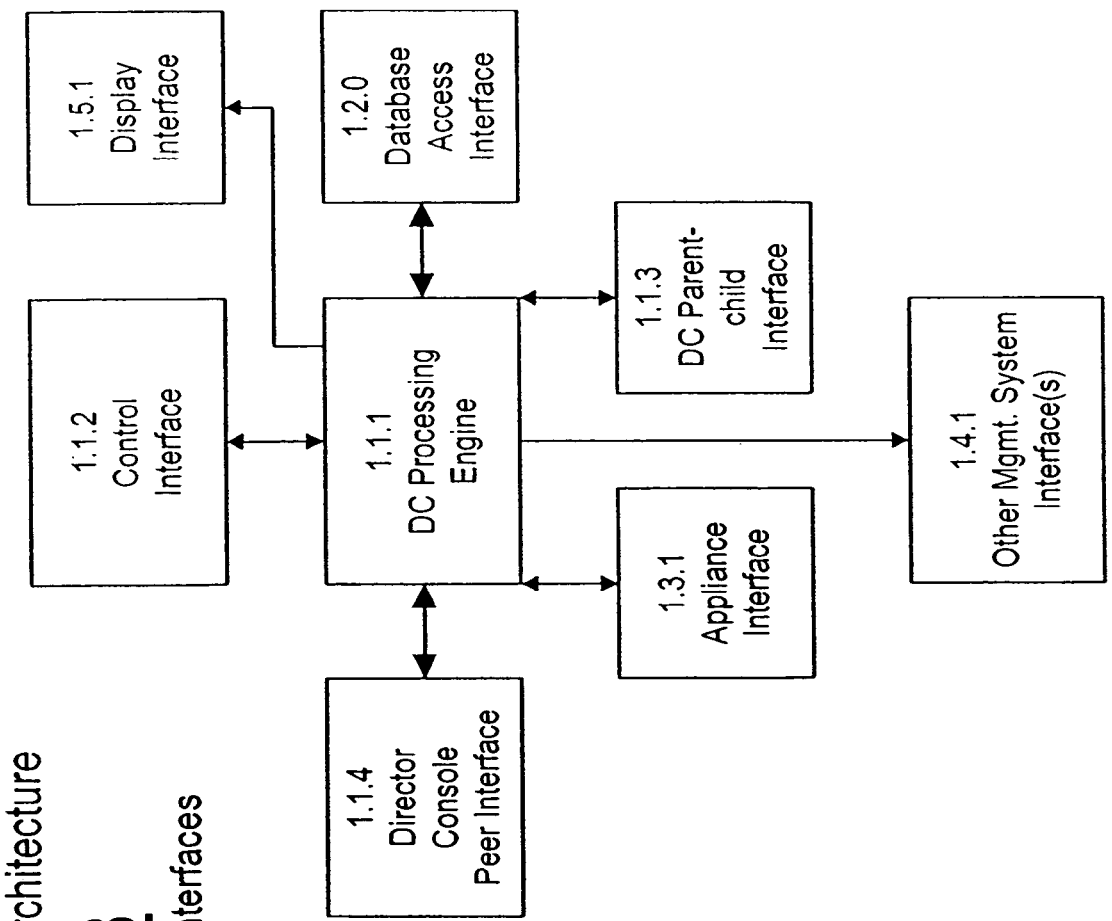
Figure 9:
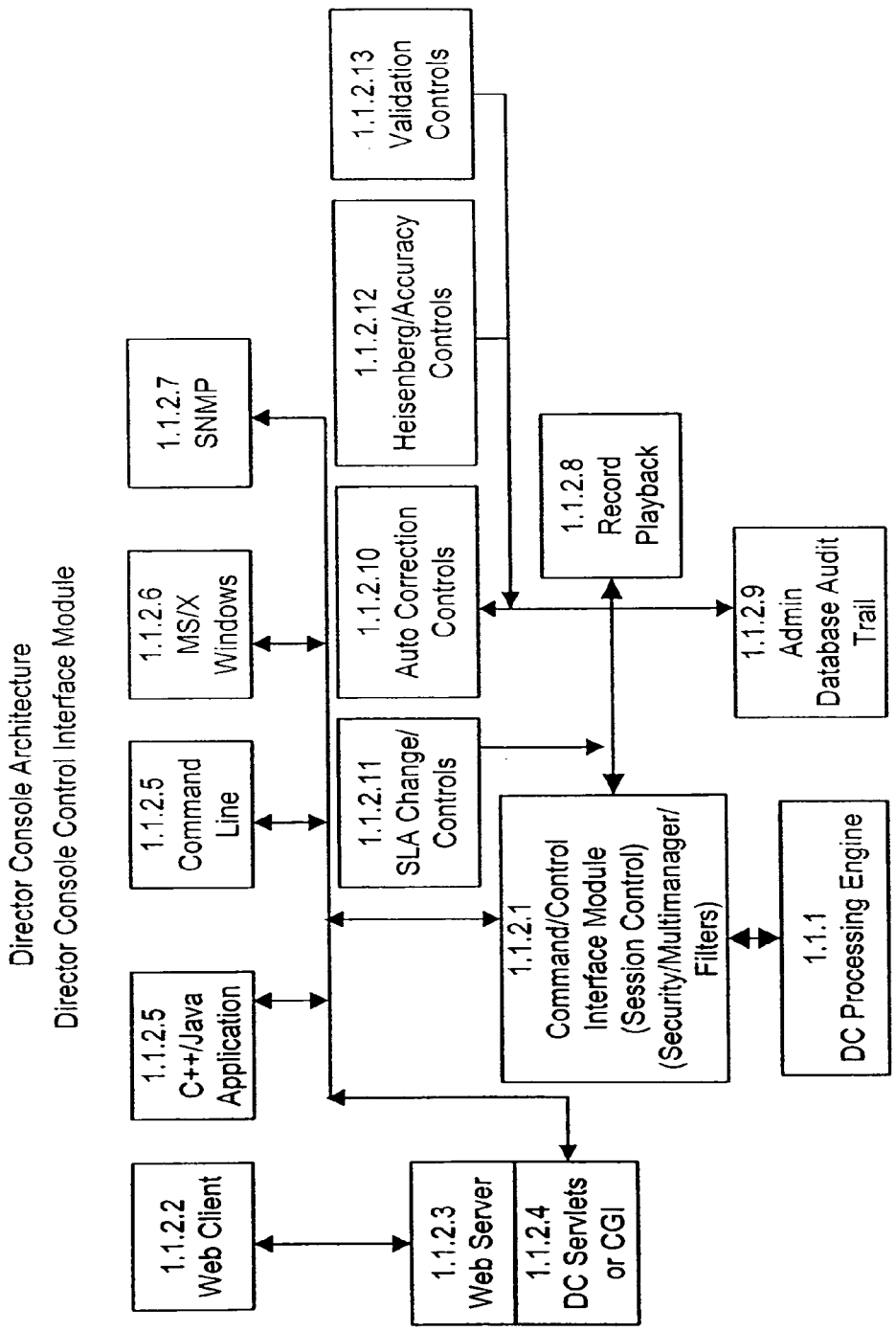
Figure 10:
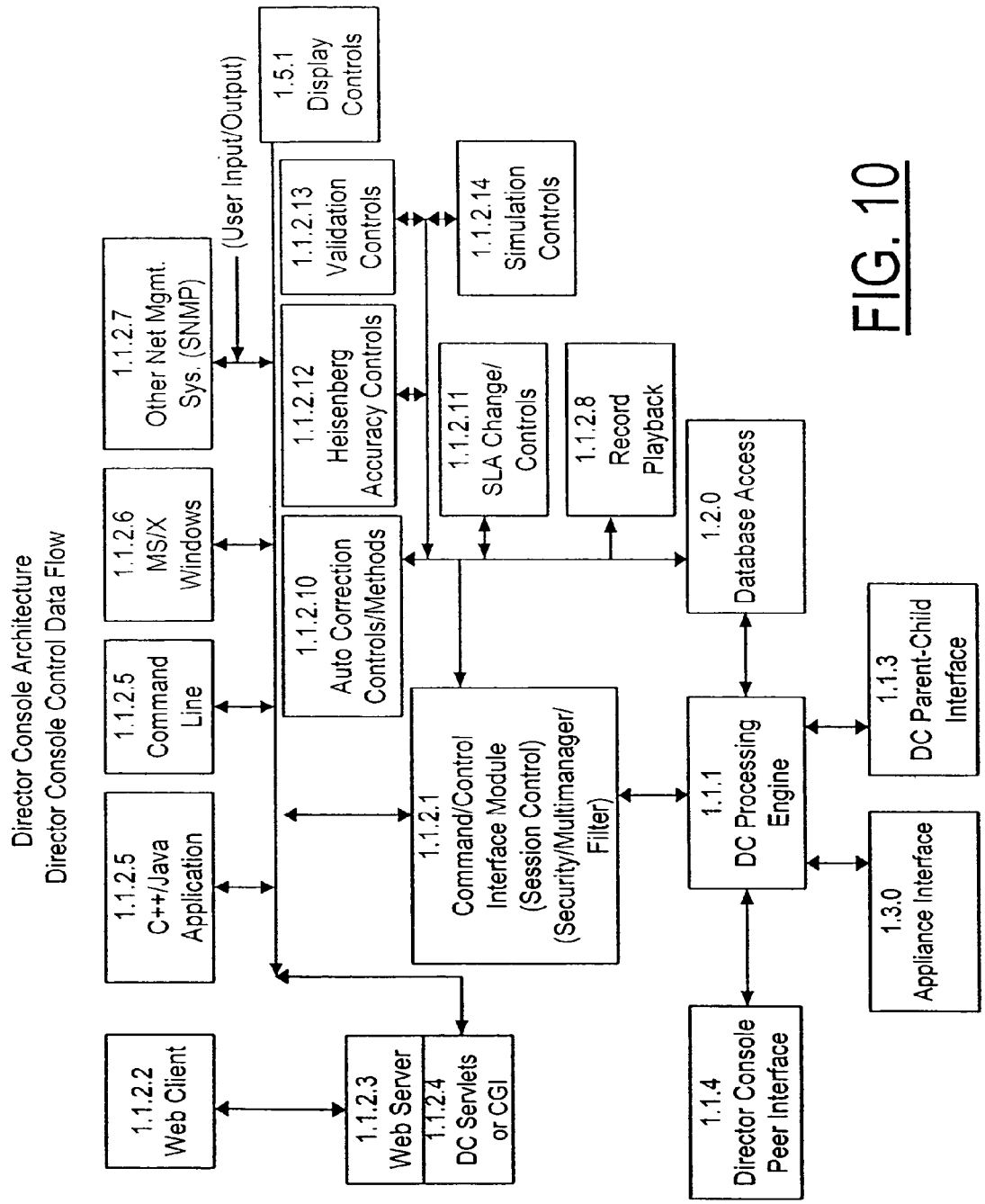
Figure 11:
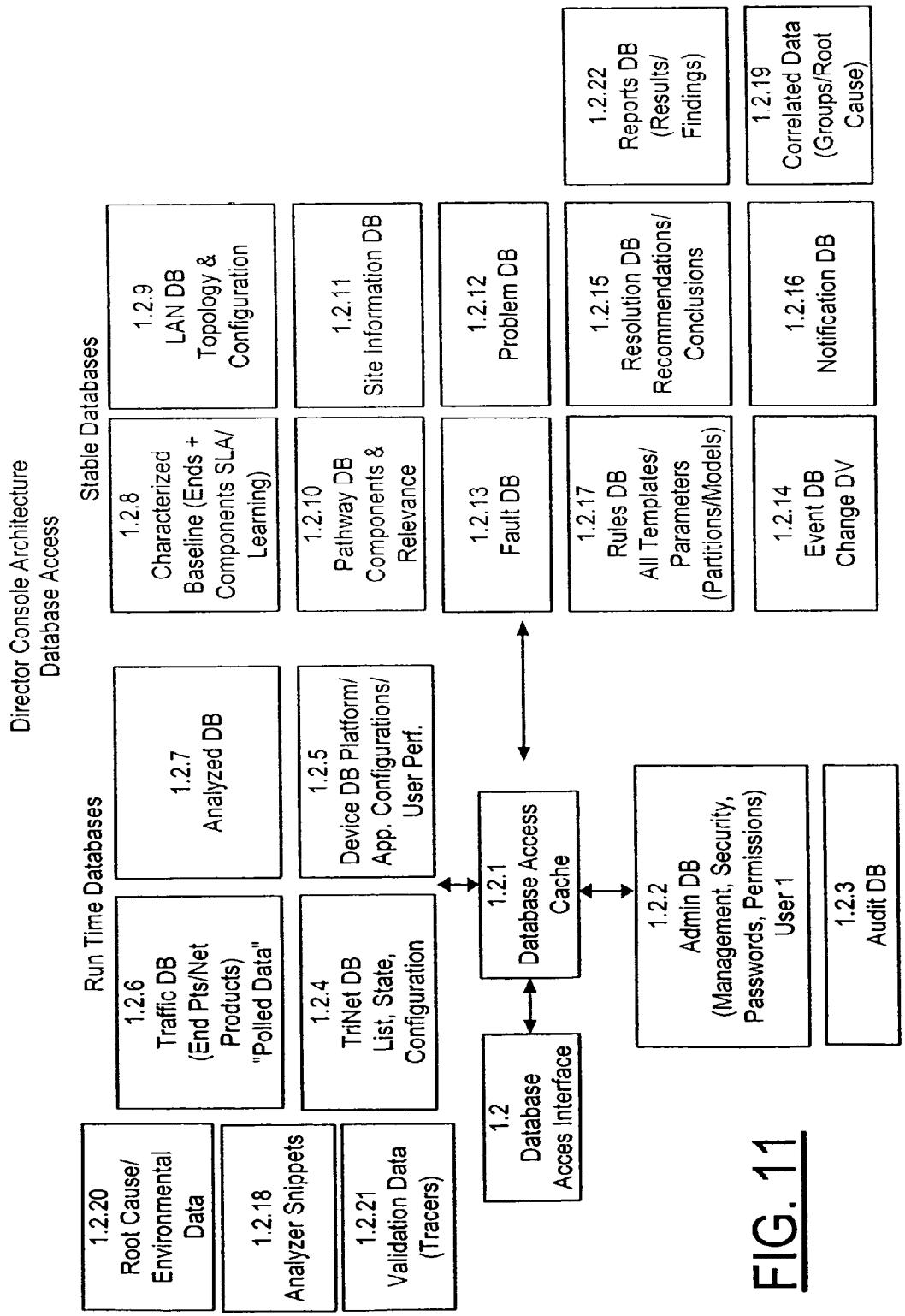
Figure 12:
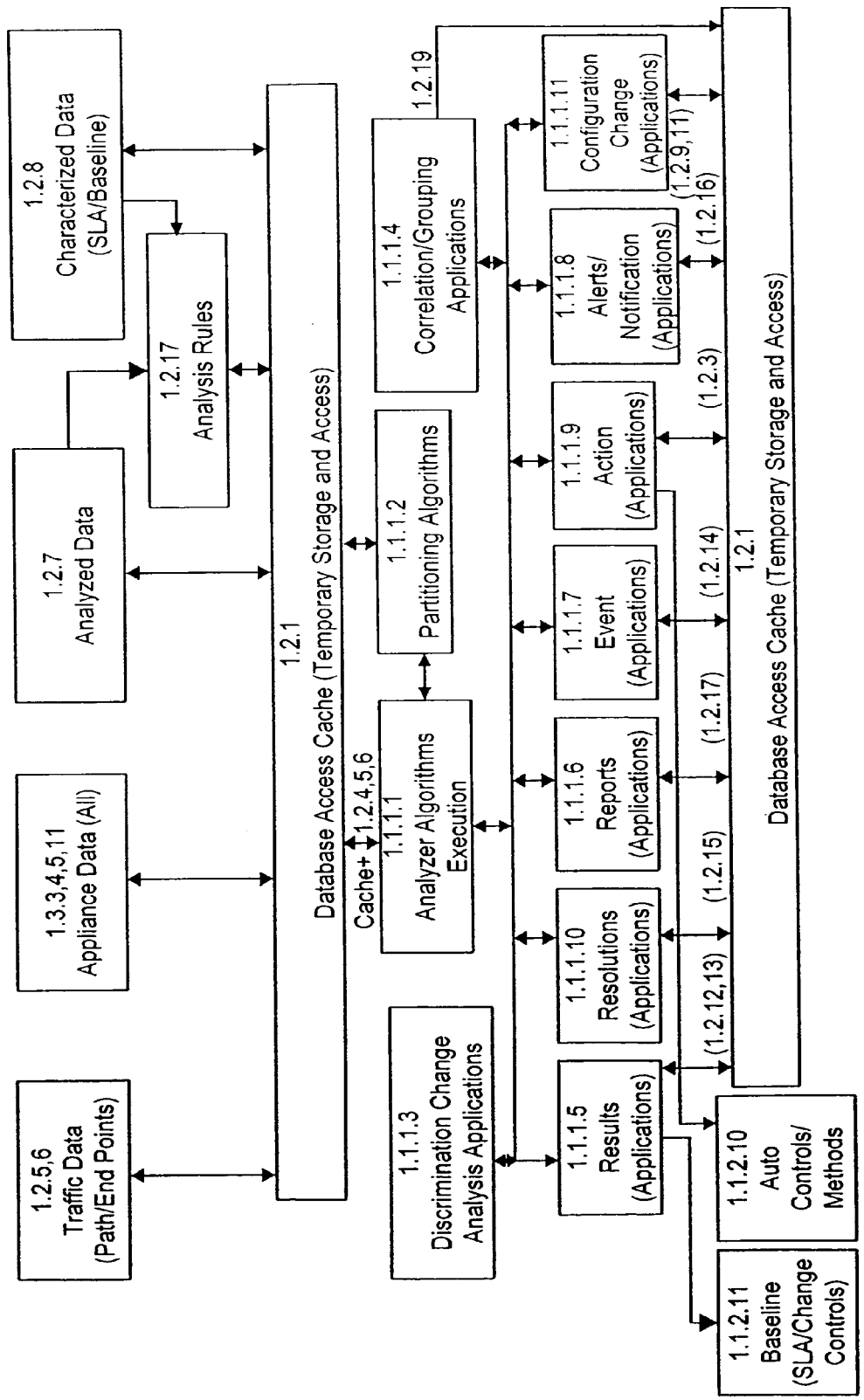
Figure 13:
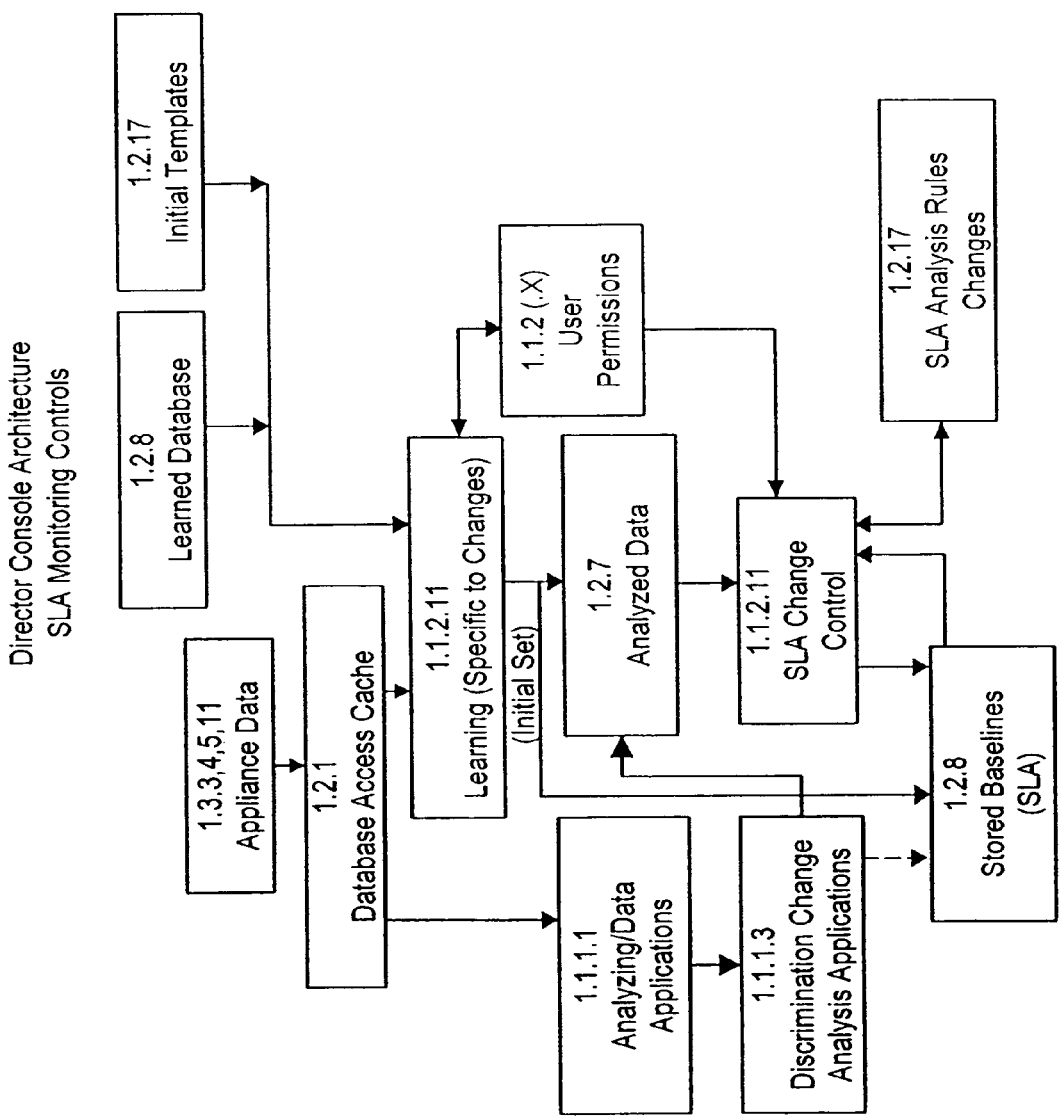
Figure 14:
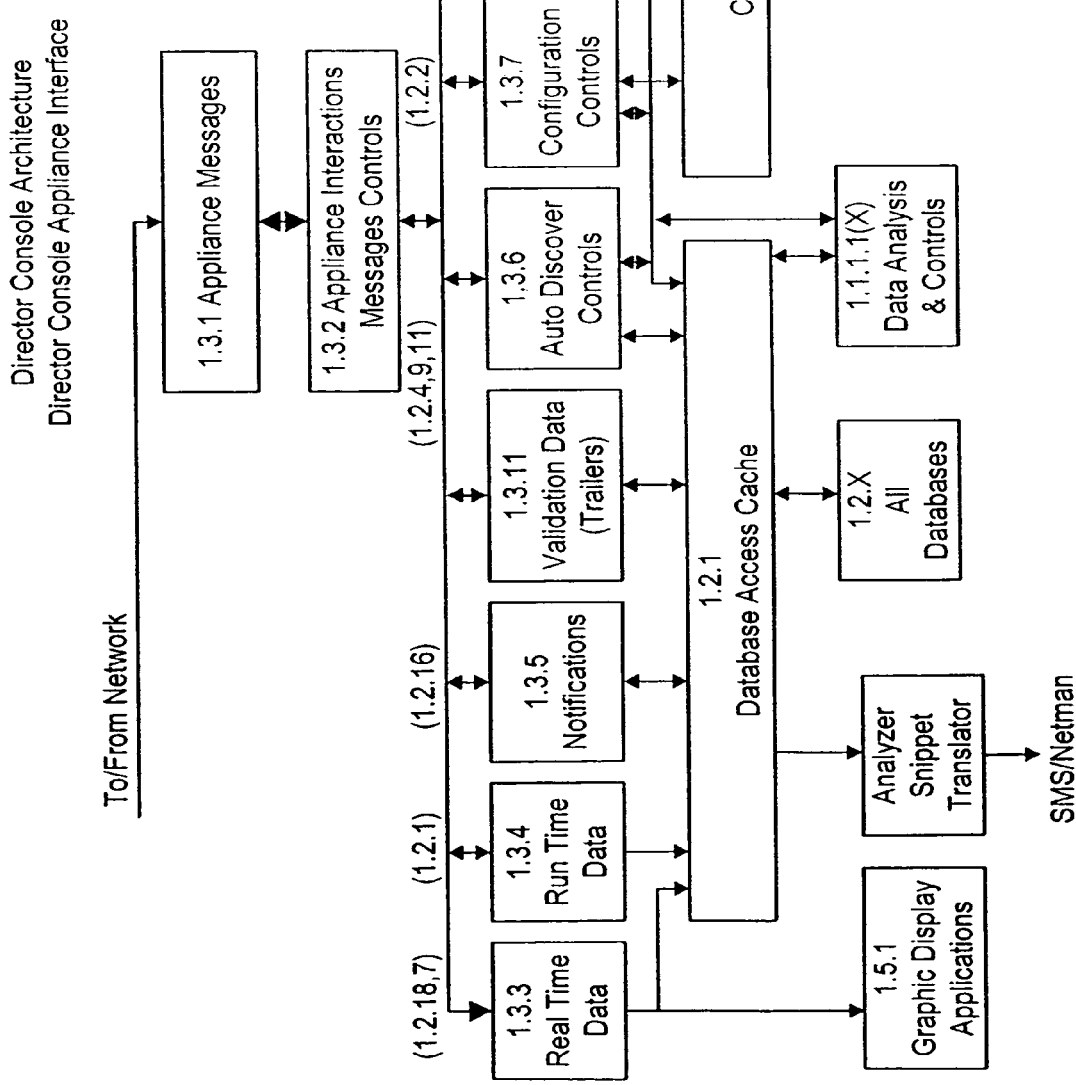

FIG. 4 shows a four-port SLA module, according to the present invention It comprises a four-port network module connected to a master control module over a backplane. The master control module in the present architecture communicates with the director console over a serial bus connected to an ethernet port but this could be routed through the backplane. FIG. 5 shows a block diagram of the four-port network module of FIG. 4. It shows some of the components used for business bandwidth baselining in particular including automatic baselining, measuring and comparing. FIG. 6 shows a block diagram of the master control module of the four-port SLA module of FIG. 4. It should be viewed in conjunction with FIG. 5.

FIGS. 7-14 show a director console architecture with particular applicability to simulation and monitoring controls. Each of the n-port SLA modules of FIG. 3 discovers the director console and the director console discovers each n-port SLA module. The discovery process may be through broadcast or multicast messages. Whenever a new n-port SLA module is added to the enterprise network, the director console and the n-port SLA module (appliance) are able to discover each other and start communicating for proper operation. Communications between the director console and the SLA module can be accomplished in various modes including (1) a request-response or pull mode, or (2) a publish-subscribe or push mode. In the request-response mode (pull mode) the director console requests and the SLA module responds. This requires a round trip and is a more expensive operation. This mode is primarily used for control messages and defines the behavior of the n-port SLA modules. The publish-subscribe mode (push mode) is used with a director console subscribing to interested data at specified intervals and/or under certain conditions wherein the SLA modules send the data to the director console through UDP messages. Since these messages are one-way UDP messages, the additional traffic on the network is minimized. For efficiency, connectionless UDP based short messages may be used for frequent data exchange with TCP based messages used for infrequent bulk transfers As more SLA modules are added to the system, the director console receiving the traffic from the SLA modules may become overloaded. To avoid this, the overloaded director clones itself into two or more instances and becomes the parent of the clones. The SLA modules communicating with the parent console will be directed to communicate with the clones. The parent distributes the SLA modules evenly to the cloned directors.

The directors are symmetrical, meaning that one can act as a parent or a child. The input and output streams may have identical format and each director console may require its own instances of some databases.

This mechanism requires a set of available systems and a means of starting the director console which takes a given state information to carry on the needed task. The newly started director consoles will assume the initiating director console as the parent.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Apparatus for controlling aspects of network traffic for sites in a telecommunications network, comprising:
    means for translating a default control template for each site into a site specific template in response to an automatic baseline input;
    means for translating the site specific template into monitoring and simulation templates;
    means for translating current end-to-end and component information into operational modes for monitoring and simulation modules according to the monitoring and simulation templates; and
    means for establishing operational controls for controlling the monitoring and simulation modules for controlling, in real time, the transmission of network management and simulation traffic.

2. The apparatus of claim 1, wherein the means for translating the site specific template into monitoring and simulation templates is modifiable by user selection carried out prior to said translating the current end-to-end and component information into operational modes for the monitoring and simulation modules.

3. The apparatus of claim 2, wherein automatic change user notifications are provided after said translating the site specific template into monitoring and simulation templates and before said translating current end-to-end and component information into operational modes for monitoring and simulation modules.

4. The apparatus of claim 3, wherein the means for translating the site specific template into simulation templates is responsive to the automatic baseline input and wherein the user is enabled to accept and prevent the automatic change user notifications for translating template and baselining characteristics into simulation templates.

5. The apparatus of claim 1, wherein automatic change user notifications are provided after said translating the site specific template into monitoring and simulation templates and before said translating current end-to-end and component information into operational modes for monitoring and simulation modules.

6. The apparatus of claim 5, wherein said means for translating the site specific template into simulation templates is responsive to the automatic baseline input and wherein the user is enabled to accept and prevent the automatic change user notifications for translating template and baselining characteristics into simulation templates.

7. The apparatus of claim 1, wherein said means for translating the site specific template into monitoring and simulation templates is responsive to the automatic baseline input.

8. The apparatus of claim 1, wherein said means for translating current end-to-end and component information into operational modes is also according to an internal back pressure indicator.

9. The apparatus of claim 8, wherein said means for establishing operational controls is responsive to the internal back pressure indicator.

10. The apparatus of claim 1, wherein said means for establishing operational controls is responsive to the internal back pressure indicator.

11. The apparatus of claim 1, further comprising means for providing user notifications to monitoring and analysis logs.

12. Apparatus for controlling aspects of network traffic for sites in a telecommunications network, comprising:
    element for translating a default control template for each site into a site specific template in response to an automatic baseline input;
    element for translating the site specific template into monitoring and simulation templates;
    element for translating current end-to-end and component information into operational modes for monitoring and simulation modules according to the monitoring and simulation templates; and
    element for establishing operational controls for controlling the monitoring and simulation modules for controlling, in real time, the transmission of network management and simulation traffic.

13. The apparatus of claim 12, wherein the element for translating the site specific template into monitoring and simulation templates is modifiable by user selection carried out prior to said translating the current end-to-end and component information into operational modes for the monitoring and simulation modules.

14. The apparatus of claim 13, wherein automatic change user notifications are provided after said translating the site specific template into monitoring and simulation templates and before said translating current end-to-end and component information into operational modes for monitoring and simulation modules.

15. The apparatus of claim 14, wherein said element for translating the site specific template into simulation templates is responsive to the automatic baseline input and wherein the user is enabled to accept and prevent the automatic change user notifications for translating template and baselining characteristics into simulation templates.

16. The apparatus of claim 12, wherein automatic change user notifications are provided after said translating the site specific template into monitoring and simulation templates and before said translating current end-to-end and component information into operational modes for monitoring and simulation modules.

17. The apparatus of claim 16, wherein said element for translating the site specific template into simulation templates is responsive to the automatic baseline input and wherein the user is enabled to accept and prevent the automatic change user notifications for translating template and baselining characteristics into simulation templates.

18. The apparatus of claim 12, wherein the element for translating the site specific template into monitoring and simulation templates is responsive to the automatic baseline input.

19. The apparatus of claim 12, wherein the element for translating current end-to-end and component information into operational modes is also according to an internal back pressure indicator.

20. The apparatus of claim 19, wherein said element for establishing operational controls is responsive to the internal back pressure indicator.

* * * * *

UNITED STATES PATENT AND TRADEMARK OFFICE
CERTIFICATE OF CORRECTION

| | |
|---|---|
| PATENT NO. | : 7,406,532 B2 |
| APPLICATION NO. | : 11/543373 |
| DATED | : July 29, 2008 |
| INVENTOR(S) | : Kryskow, Jr. et al. |

Page 1 of 1

It is certified that error appears in the above-identified patent and that said Letters Patent is hereby corrected as shown below:

In column 3 at line 53, please delete "(Attorney Docket No. 402-127.3-1)" and insert --PCT/US01/05021-- therefor.
In column 4 at line 30, please delete "*".
In column 4 at line 55, after "No." please insert --(PCT/US01/05119)--.
In column 4 at line 58, after "No." please insert --(PCT/US01/05021)--.
In column 5 at line 6, after "verified" please insert --.--.
In column 5 at line 15, after "tool" please insert --.--.
In column 5 at line 40, after "components" please insert --.--.
In column 5 at line 51, after "indicated" please insert --.--.
In column 6 at line 8, after "both" please insert --.--.
In column 6 at line 14, after "invention" please insert --.--.
In column 6 at line 53, after "transfers" please insert --.--.

Signed and Sealed this

Eighth Day of December, 2009

David J. Kappos
*Director of the United States Patent and Trademark Office*